United States Patent [19]
Cole

[11] Patent Number: 5,941,193
[45] Date of Patent: Aug. 24, 1999

[54] ADJUSTABLE POULTRY FEEDER ASSEMBLY

[75] Inventor: Theodore John Cole, Milford, Ind.

[73] Assignee: CTB, Inc., Milford, Ind.

[21] Appl. No.: 08/962,787

[22] Filed: Nov. 3, 1997

[51] Int. Cl.⁶ .............................................. A01K 39/01
[52] U.S. Cl. .......................................................... 119/57.4
[58] Field of Search .......................... 119/52.1, 53, 57.1, 119/57.2, 57.4, 57.5

[56] References Cited

U.S. PATENT DOCUMENTS

| | | | |
|---|---|---|---|
| Re. 25,589 | 6/1964 | Hostetler et al. | 119/57.4 |
| 1,666,322 | 4/1928 | West | 119/52.1 |
| 2,667,858 | 2/1954 | Cussotti | 119/52.1 |
| 3,105,463 | 10/1963 | Pilch | 119/57.4 |
| 3,230,933 | 1/1966 | Myers et al. | 119/53 |
| 3,325,055 | 6/1967 | Marshall | 119/56.2 |
| 3,388,690 | 6/1968 | Hostetler et al. | 119/53 |
| 3,415,228 | 12/1968 | Myers | 119/80 |
| 3,415,229 | 12/1968 | Myers | 119/51.11 |
| 3,479,947 | 11/1969 | Myers | 454/344 |
| 3,511,215 | 5/1970 | Myers | 119/53 |
| 3,523,519 | 8/1970 | Hostetler | 119/53.5 |
| 3,545,408 | 12/1970 | Wert | 119/51.11 |
| 3,585,970 | 6/1971 | Scott | 119/53 |
| 3,611,995 | 10/1971 | Murto | 119/57.2 |
| 3,628,505 | 12/1971 | Myers | 119/61 |
| 3,675,627 | 7/1972 | Myers | 119/72 |
| 3,776,191 | 12/1973 | Murto | 119/57.3 |
| 3,799,116 | 3/1974 | Hostetler | 119/57.4 |
| 3,811,412 | 5/1974 | Murto et al. | 119/53 |
| 3,827,405 | 8/1974 | Allen | 119/53 |
| 3,869,006 | 3/1975 | Hostetler | 177/60 |
| 3,904,082 | 9/1975 | Hostetler | 119/51.11 |
| 3,911,868 | 10/1975 | Brembeck | 119/53 |
| 4,003,339 | 1/1977 | Hostetler | 119/57.4 |
| 4,070,990 | 1/1978 | Swartzendruber | 119/53 |
| 4,226,211 | 10/1980 | Barrentine | 119/337 |
| 4,252,083 | 2/1981 | Gilst et al. | 119/51.11 |
| 4,317,430 | 3/1982 | Swartzendruber | 119/57.4 |
| 4,337,728 | 7/1982 | Van Gilst et al. | 119/57.4 |
| 4,476,811 | 10/1984 | Swartzendruber | 119/57.4 |
| 4,488,509 | 12/1984 | Awalt | 119/53 |
| 4,834,026 | 5/1989 | Brembeck et al. | 119/53 |
| 4,995,343 | 2/1991 | Cole et al. | 119/53 |
| 5,092,274 | 3/1992 | Cole et al. | 119/57.4 |
| 5,113,797 | 5/1992 | Van Daele | 119/53 |
| 5,794,562 | 8/1998 | Hart | 119/57.4 |

FOREIGN PATENT DOCUMENTS

| | | |
|---|---|---|
| 0105571 | 4/1984 | European Pat. Off. . |

*Primary Examiner*—Peter M. Poon
*Assistant Examiner*—Elizabeth Shaw
*Attorney, Agent, or Firm*—Trexler, Bushnell, Giangiorgi & Blackstone, Ltd.

[57] ABSTRACT

A feeder assembly for birds or other animals having a pan member, a feeder tube defining a channel for receiving feed from a feed supply, a plurality of wing members having a plurality of fingers for adjustably engaging the feeder tube, and a cone member disposed about the feeder tube and slidably mounted to the plurality of wing members by a plurality of engaging arms. The cone member is adapted to slide relative to the feeder tube between a lowered position and a raised position. The pan member and an end of the cone member define a feed opening for permitting feed to pass from the feeder tube to the pan member for presentation. The feed opening can be adjusted in size by either adjusting the wing members relative to the pan member or by sliding and adjustably positioning the cone member relative to the feeder tube and the wing members.

27 Claims, 2 Drawing Sheets

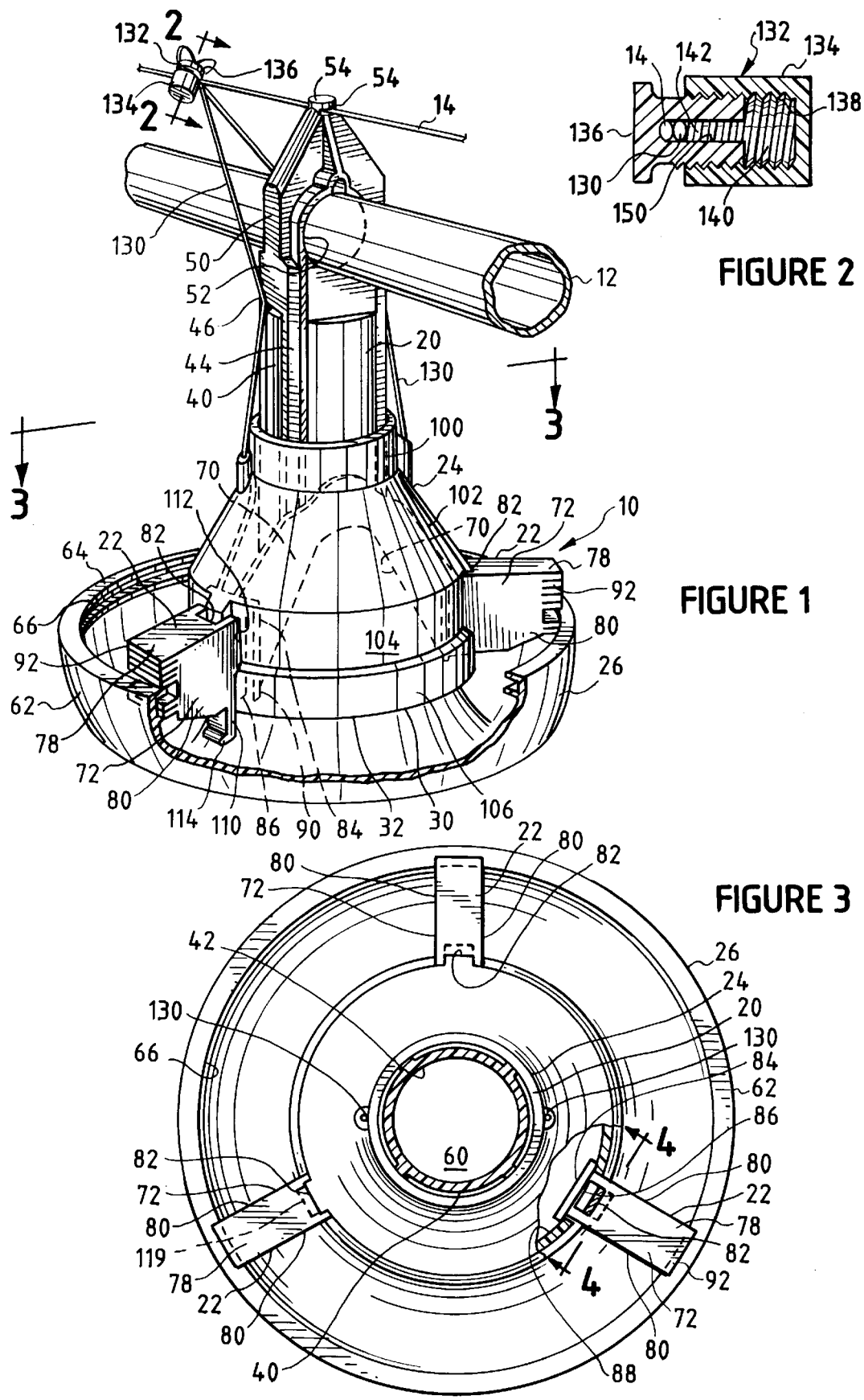

ADJUSTABLE POULTRY FEEDER ASSEMBLY

This invention relates to an adjustable feeder assembly for a feeding system for birds or other animals.

BACKGROUND

Utilization of efficient low-cost poultry feeding systems, which allow poultry and the like to be raised from inception to harvest with a minimum amount of time and effort, is a prerequisite to economic survival in the business of raising poultry. An important component of such poultry feeding systems are the poultry feeder assemblies that present the feed to the poultry.

Operation of one known type of poultry feeding system, for instance, commences with a supply of feed being conveyed from a storage hopper, through a series of transport conduits and ultimately into individual poultry feeder pan assemblies, which are readily accessible to the feeding poultry crop. An example of a feeder assembly that has been successful in connection with such a poultry feeding system is the feeder assembly disclosed in U.S. Pat. No. 4,834,026, which is incorporated herein in its entirety by reference. The poultry feeder assembly of the '026 patent includes a dome-shaped feeder body contoured to prevent poultry from roosting upon it and a feeder tube extending through an uppermost surface of the dome-shaped body to operatively connect with a feed transport conveyor system. Feed supplied by the transport conveyor falls into the feeder tube and is directed through a feed opening at the bottom of the dome-shaped body and into a pan of the feeder assembly which is disposed below the lowermost edges of both the dome-shaped body and feeder tube. The outer periphery of the pan, in combination with the outer wall of the dome-shaped body, forms a limited annular poultry feeding area accessible to a large number of feeding poultry.

Releasable and adjustable engagement between the pan and the remaining structure is facilitated by circumferentially-spaced wing members formed integral with and extending outwardly of the dome-shaped feeder body. The distal end of these wing members are provided with a plurality of closely-spaced fingers which can be adjustably positioned to interlock with a corresponding arrangement of flange members provided on an annular lip or rim portion of the pan to incrementally adjust the size of the feed opening. Utilization of materials with sufficient resilient flexibility to form the pan member of the poultry feeder assembly allows the feed system operator to manually release and adjustably position the fingers relative to the pan member, and thereby adjust the size of the feed opening, without the aid of any tool. Thus, the feeder can be easily adjusted at its point of use to accommodate a variety of different-sized birds and to adapt to a varying range of feed flow characteristics.

OBJECTS AND SUMMARY

It is object of the present invention to provide a feeder assembly defining a feed opening that can be adjusted in size in a manner similar to that of the feeder assembly of U.S. Pat. No. 4,834,026, but also in a manner wherein the wing members do not need to be re-positioned relative to the pan.

It is a further object of the present invention to provide a feeder assembly defining a feed opening that can be adjusted in size in very fine increments and over a wide range of sizes.

It is a further object of the present invention to provide a feeder assembly defining a feed opening and having a slidably-mounted cone member for adjusting the size of the feeder opening.

In accordance with these and other objects, the present invention provides a feeder assembly for birds or animals having a pan member, a feeder tube defining a channel for receiving feed from a feed supply, a plurality of wing members joined to the feeder tube, and a cone member disposed about the feeder tube and slidably mounted to the plurality of wing members and adapted to slide relative to the wing members between a lowered position and a raised position. The pan member and an end of the cone member define a feed opening for permitting feed to pass from the feeder tube to the pan member for presentation and consumption. The feed opening increases in size as the cone member is moved toward the raised position.

Desirably, each of the wing members includes at its distal end a plurality of engaging fingers for adjustably engaging the pan member and for adjusting the size of the opening. Thus, with the feeder assembly in accordance with a preferred embodiment of the invention, the size of the feed opening can be adjusted by sliding the cone member relative to the wing members or by adjusting the positioning of the engaging fingers relative to the pan member.

The cone member preferably includes a plurality of engaging arms slidably engageable with the wing members. Each of the arms is slidably received within an aperture defined by a respective wing member. Each arm includes a locking ledge, preferably at its distal or bottom end, for engaging the respective wing member. The locking ledges are adapted to prevent the cone member from disengaging from the wing members when the cone member is moved toward the raised position. Preferably, the cone member defines a plurality of pairs of slots, each pair being disposed about a respective engaging arm, and each wing member is received by a respective pair of slots. Each of the wing members includes a sealing member abutting an inner wall of the cone member to prevent feed from passing through the slots. If desired, the engaging arms of the cone member may be flexible to facilitate engagement and disengagement of the cone member and the wing members.

The cone member may be adjustably positioned relative to the feeder tube in any suitable manner. In a preferred embodiment, for example, the feeder assembly may include a connector in the form of pair of cords or the like secured to the cone member and a locking member for joining the cords together to or around a support. The support may, for example, be in the form of a wire that extends parallel to a feed supply conduit or in the form of the feed supply conduit. The locking member preferably is in the form of a cable clamp joined to the wire and moveable with the wire to enable the cone member to be adjustably positioned relative to the feeder tube.

Accordingly, the feeder assembly in accordance with the invention provides many benefits. For example, the cone member can be adjusted quickly and easily relative to the wing members, and the feed opening can be adjusted in size in fine increments.

Additionally, with the feeder assembly in accordance with a preferred embodiment of the invention, the feed opening can be adjusted in size in two different manners, which provides convenience and flexibility to the poultry grower. The feed opening can be adjusted to the desired size by either adjusting the wing members relative to the pan member or by sliding and adjustably positioning the cone member relative to the feeder tube and the wing members. As a result, the feeder assembly enables the poultry grower to adjust the size of the feed opening quickly and easily during all of the various poultry growing stages.

BRIEF DESCRIPTION OF DRAWINGS

The present invention and the advantages thereof will become more apparent upon consideration of the following detailed description when taken in conjunction with the accompanying drawings of which:

FIG. 1 is a fragmentary, perspective view of the poultry feeder assembly in accordance with a preferred embodiment of the invention engaged with a feed supply conduit and a wire of a poultry feeder system, illustrating the cone member in a lowered position;

FIG. 2 is a cross-sectional view of the locking member of the poultry feeder taken along the lines 2—2 of FIG. 1;

FIG. 3 is a cross-sectional view taken along the lines 3—3 of FIG. 1;

DETAILED DESCRIPTION OF PREFERRED EMBODIMENTS

Figure 4:
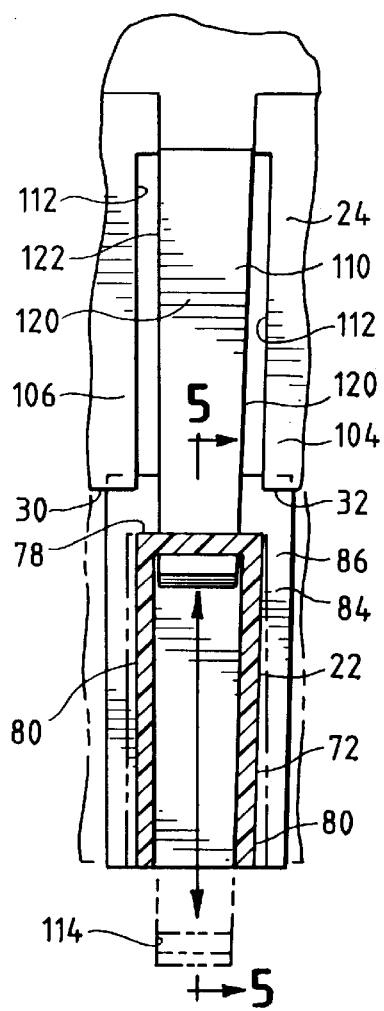
FIG. 4 is a cross-sectional view taken along the lines 4—4 of FIG. 2, illustrating one of the engaging arms of the cone member and one of the wing members in engagement with the engaging arm when the cone is in a raised position.
Figure 5:
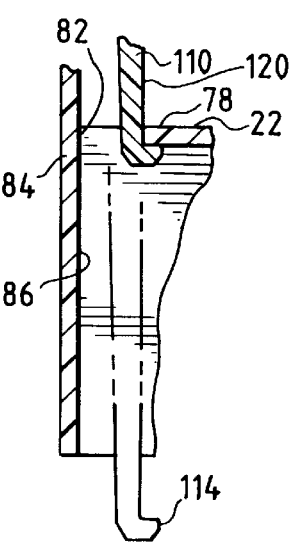
FIG. 5 is a cross-sectional view taken along the lines 5—5 of FIG. 4.

FIGS. 1–5 illustrate a feeder assembly 10 in accordance with a preferred embodiment of the invention. The illustrated feeder assembly 10 desirably is adapted to be used in connection with a poultry feeder system that includes a feed supply conduit 12 and desirably a wire 14 extending substantially parallel to the feed supply conduit 12. The wire 14 is often included with poultry feeder systems to ensure that birds cannot roost on the feeder assembly 10, and usually carries an electric current. Desirably, the feeder system includes a plurality of feeder assemblies 10, which can be vertically adjusted to either rest on the ground or be suspended above the ground by raising or lowering the feed supply conduit 12 or by any other suitable means.

The illustrated feeder assembly 10 generally comprises a feeder tube 20, three circumferentially-spaced wing members 22 joined to the feeder tube 20, a cone member 24 slidably engaged with both the feeder tube 20 and the wing members 22, and a pan member 26. A feed opening 30 is defined by a bottom rim 32 of the cone member 24 and the pan member 26, the size of which opening desirably can be adjusted in two different manners, as described in detail below.

Figure 6:
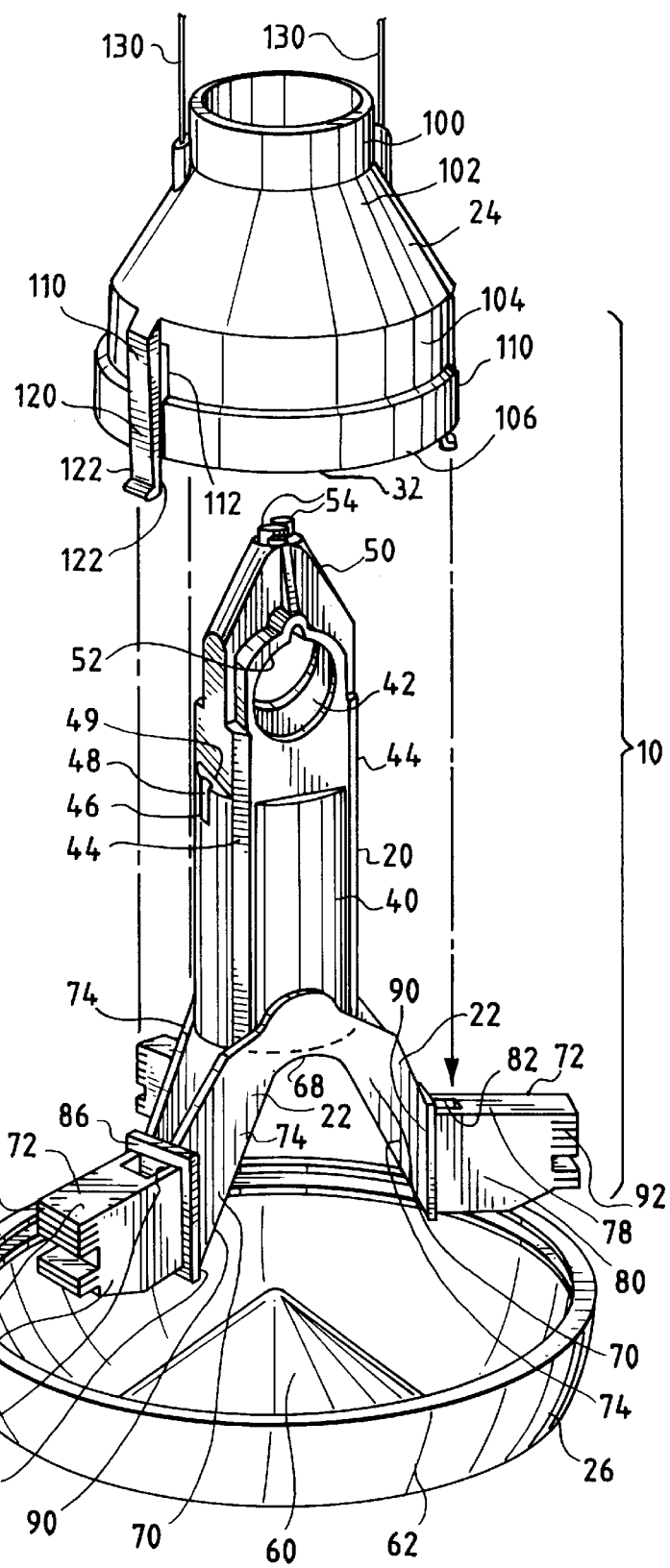
FIG. 6 is an exploded, perspective view of the poultry feeder assembly of FIG. 1.

The feeder tube 20 includes a hollow and generally cylindrical portion 40 and defines a channel 42 for receiving feed from the feed supply conduit 12. The three wing members 22 desirably are integral with the cylindrical portion 40 and radially extend from the bottom of the cylindrical portion 40 for engagement with the pan member 26. The feeder tube 20 desirably also includes four spaced ridges 44 extending along most of its length to facilitate sliding of the cone member 24 relative to the feeder tube 20. The illustrated feeder tube also defines a pair of diametrically opposed passages 46 for receiving cords 130, as hereinafter described. Each passage 46 includes a bore 48 defined on the face of the respective cylindrical portion 40 and an opening 49 defined by the top of the respective cylindrical portion. Each bore 48 is contiguous with the respective opening 49 to form the respective passage 46 (see FIGS. 1 and 6).

The feeder tube 20 also includes a locking part 50 at the upper end of the cylindrical portion 40, that desirably is integral with the cylindrical portion. The locking part 50 defines a bore 52 for receiving the feed supply conduit 12. The bore 52 extends generally perpendicular to the channel 42. The locking part 50 desirably also includes a pair of engaging projections 54 for engaging the wire 14 of the feeder system. An opening (not shown) is defined in the feed supply conduit 12 through which feed can enter into the channel 42 of the feeder tube 20 from the feed supply conduit 12.

In a preferred embodiment, the pan member 26 is bowl-shaped and includes an upstanding conical portion 60 extending from the center of the pan member. The pan member 26 also includes an upstanding peripheral wall 62 that terminates in a rim 64. The rim 64 includes an inward flange 66 for engaging with the wing members 22 as hereinafter described. In the illustrated embodiment, the flange 66 comprises a double flange arrangement.

In a preferred embodiment, the wing members 22 are spaced about the circumference of the bottom end 68 of the cylindrical portion 40, and each wing member 22 comprises a connecting portion 70 and a wing portion 72 integral therewith. The connecting portions 70 extend generally downwardly and radially outwardly from the bottom end 68 of the cylindrical portion 40. Each connecting portion 70 includes a pair of spaced side members 74 that converge toward each other as the side members extend toward the wing portion 72.

The wing portions 72 desirably extend radially outwardly from the ends of the connecting portions 70. Each wing portion 72 desirably comprises a top wall 78 joining together a pair of opposed side walls 80 that extend downwardly from the top wall. The top wall 78 of each wing portion 72 defines an aperture 82 for slidably engaging the cone member 24 as hereinafter described. The side walls 80 desirably are parallel to each other, and are joined together along their inner or proximal ends by a sealing member 84. In the illustrated embodiment, the outer side 86 of each sealing member 84 abuts the inner wall 88 of the cone member 24 and is arcuate to complement the arcuate configuration of the inner wall.

Each of the illustrated sealing members 84 extends from the bottom of the respective pair of side walls 80 to beyond the top wall 78 of the respective wing portion 72. In the illustrated embodiment, each wing portion 72 also includes an internal reinforcement wall (not shown) connecting together the insides of the side walls 80. The side members 74 of the connecting portion 70 terminate at the inner sides 90 of the sealing members 84.

A plurality of closely spaced fingers 92 extend radially outwardly from the outer or distal ends of the side walls 80. The fingers 92 are adapted to adjustably engage the flange 66 of the peripheral wall 62 of the pan member 26 to permit adjustable positioning of the feeder tube 20 and the cone member 24 relative to the pan member. Since the size of the feed opening 30 depends upon the positioning of the cone member 24 relative to the pan member 26, the size of the feed opening can be adjusted by adjustably positioning the fingers 92 relative to the flange 66 of the pan member.

The cone member 24 is hollow and is disposed about the feeder tube 20. It desirably is configured to prevent poultry from roosting upon it. The illustrated cone member, for example, includes a generally cylindrical top portion 100 slidably engaging the feeder tube 20, a central conical truncated portion 102 and a generally cylindrical base portion 104 that includes a circumferential ridge 106. In the illustrated embodiment, the base portion 104 also is tapered slightly.

The base portion 104 of the cone member 24 includes three circumferentially-spaced engaging arms 110 and defines three pairs of slots 112, each of which is disposed about one of the engaging arms 110. Each engaging arm 110 is slidably received by the aperture 82 of the wing portion 72 of a respective wing member 22, and each pair of slots 112 slidably receives the side walls 80 of the wing portion. In operation, the slots 112 desirably are closed at least in part by the sealing members 84 to minimize or reduce the amount of feed that would otherwise pass through the slots.

Each engaging arm 110 desirably includes a locking ledge 114 at its distal end. The locking ledge 114 desirably extends radially outwardly and is adapted to engage the bottom of the top wall 78 when the cone member 24 is moved to the raised position to prevent the cone member from disengaging from the wing portion during normal operating conditions. However, the engaging arms 110 desirably are flexible to facilitate manual engagement and disengagement of the cone member 24 with the wing members 22 when so desired.

Each engaging arm 110 desirably includes a front engaging surface 120 and a pair of opposed side engaging surfaces 122. The front and side engaging surfaces 120 and 122 extend from near the upper end of the base portion 104 beyond the bottom rim 32 of the cone member 24. In the illustrated embodiment, the engaging arms 110 protrude radially outwardly from the base portion 104 of the cone member 24. The front engaging surface 120 is joined to the upper end of the base portion 104 by an inclined surface 126. The front and side engaging surfaces 120 and 122 desirably extend in a generally vertical direction to facilitate vertical sliding action of the cone member 24 relative to the wing portions 72.

In a preferred embodiment, the feeder assembly also includes a pair of cords 130 that are secured to the cone member and a locking member in the form of a cable clamp 132 joining the cords with the wire 14. The cords 130 can be secured to the cone member 24 in any suitable manner, preferably 180° apart, and desirably extend around the feed supply conduit 12. Each cord 130 also passes through one of the passages 46 defined by the feeder tube 20. With this configuration, pulling of the wire 14 in one direction causes the cone member 24 to be raised relative to the feeder tube 20 and pulling of the wire in the other direction causes the cone member 24 to be lowered relative to the feeder tube 20. The pulling of the wire 14 can be accomplished in any suitable manner such as, for example, by turning a winch associated with the wire. If desired, the size of the feed opening 30 can also be adjusted in any other suitable manner, such as, for example by adjusting the positioning of the cable clamp 132 relative to the feeder tube 20.

The cable clamp 132 can have any suitable construction. For example, the illustrated cable clamp 132, which is a commercially-available fastener, comprises a wing nut 134 and a threaded bolt 136 adjustably engageable with the wing nut. The wing nut 134 includes a threaded inner wall 138 that defines a bore 140, and a stem 142 within the bore. The bolt 136 defines a diametrical slot 150 for receiving the cords 130 and the stem 142 of the wing nut 134. Thus, the cable clamp 132 can be positioned on the cords 130 and the wire 14 at the appropriate position, and the wing nut 134 twisted to lock the cable clamp in place.

Accordingly, the size of the feed opening 30 defined by the feeder assembly 10 in accordance with a preferred embodiment of the invention can be adjusted by either adjusting the wing members 22 relative to the pan member 26, or by sliding the cone member 24 relative to the feeder tube 20 by any suitable manner, or a combination of both. As a result, the feed opening 30 can be adjusted in fine movements over a wide range of sizes. Additionally, the ability to adjust the size of the feed opening 30 in two different manners provides the grower poultry with added convenience.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A feeder assembly for birds or other animals comprising:
    (a) a pan member;
    (b) a feeder tube defining a channel for receiving feed from a feed supply;
    (c) a plurality of wing members joined to the feeder tube; and
    (d) a cone member disposed about the feeder tube and slidably mounted to, and in contact with, the plurality of wing members, the cone member adapted to slide relative to the wing members between a lowered position and a raised position, the pan member and an end of the cone member defining a feed opening for permitting feed to pass from the feeder tube to the pan member for presentation and consumption, the feed opening increasing in size as the cone member is moved toward the raised position.

2. The feeder assembly of claim 1 further including a connector for engaging the feeder assembly with a support of a poultry feeding system and for adjustably positioning the cone member relative to the feeder tube.

3. A feeder assembly for birds or other animals comprising:
    (a) a pan member;
    (b) a feeder tube defining a channel for receiving feed from a feed supply;
    (c) a plurality of wing members joined to the feeder tube; and
    (d) a cone member disposed about the feeder tube and slidably mounted to the plurality of wing members, the cone member adapted to slide relative to the wing members between a lowered position and a raised position, the pan member and an end of the cone member defining a feed opening for permitting feed to pass from the feeder tube to the pan member for presentation and consumption, the feed opening increasing in size as the cone member is moved toward the raised position, wherein each of the wing members includes a plurality of fingers at its distal end for adjustably engaging the pan member and adjusting the size of the feed opening.

4. A feeder assembly for birds or other animals comprising:
    (a) a pan member;
    (b) a feeder tube defining a channel for receiving feed from a feed supply;
    (c) a plurality of wing members joined to the feeder tube; and (d) a cone member disposed about the feeder tube and slidably mounted to the plurality of wing members, the cone member adapted to slide relative to the wing members between a lowered position and a raised position, the pan member and an end of the cone member defining a feed opening for permitting feed to pass from the feeder tube to the pan member for presentation and consumption, the feed opening increasing in size as the cone member is moved toward the raised position, wherein the cone member includes a plurality of engaging arms slidably engaging the wing members.

5. The feeder assembly of claim 4 wherein each of the wing members defines an aperture for slidably receiving a respective engaging arm.

6. The feeder assembly of claim 5 wherein each of the engaging arms includes a locking ledge adapted to engage a respective wing member when the cone member is in the raised position to prevent the cone member from disengaging from the wing members.

7. The feeder assembly of claim 6 wherein the locking ledges are formed at the distal ends of the engaging arms.

8. The feeder assembly of claim 5 wherein the engaging arms are flexible and the cone member is disengageable with the wing members by flexing the engaging arms.

9. The feeder assembly of claim 5 wherein the cone member defines a plurality of pairs of slots, each pair of slots disposed about the respective engaging arm and slidably receiving portions of a respective wing member.

10. The feeder assembly of claim 9 wherein each of the wing members includes a sealing member substantially closing a respective pair of slots when the cone member is in the lowered position.

11. The feeder assembly of claim 10 wherein the sealing members abut an inner wall of the cone member.

12. The feeder assembly of claim 11 wherein the sealing members and the inner wall of the cone member are arcuate.

13. The feeder assembly of claim 5 wherein each wing member includes a top wall, and each aperture being defined by a respective top wall.

14. The feeder assembly of claim 13 wherein each wing member includes a pair of spaced side walls interconnected by the respective top wall.

15. The feeder assembly of claim 5 wherein each wing member comprises a wing portion and a connecting portion connecting the wing portion to the feeder tube, each wing portion including a top wall and each aperture being defined by a respective top wall.

16. The feeder assembly of claim 15 wherein each wing portion includes a pair of spaced side walls interconnected by a respective top wall.

17. The feeder assembly of claim 15 wherein the connecting members extend downwardly and radially outwardly from a bottom end of the feeder tube.

18. The feeder assembly of claim 15 wherein the wing portions extend radially outwardly relative to the feeder tube.

19. The feeder assembly of claim 15 wherein the wing members and the feeder tube are integral with each other.

20. A feeder assembly for birds or other animals comprising:
(a) a pan member;
(b) a feeder tube defining a channel for receiving feed from a feed supply;
(c) a plurality of wing members joined to the feeder tube; and
(d) a cone member disposed about the feeder tube and slidably mounted to the plurality of wing members, the cone member adapted to slide relative to the wing members between a lowered position and a raised position, the pan member and an end of the cone member defining a feed opening for permitting feed to pass from the feeder tube to the pan member for presentation and consumption, the feed opening increasing in size as the cone member is moved toward the raised position; and
(e) a connector for engaging the feeder assembly with a support of a poultry feeding system and for adjustably positioning the cone member relative to the feeder tube, wherein the connector includes a pair of cords secured to the cone member and a locking member connecting the cords together.

21. A feeder assembly for birds or other animals comprising:
(a) a pan member;
(b) a feeder tube defining a channel for receiving feed from a feed supply;
(c) a plurality of wing members joined to the feeder tube; and
(d) a cone member disposed about the feeder tube and slidably mounted to the plurality of wing members, the cone member adapted to slide relative to the wing members between a lowered position and a raised position, the pan member and an end of the cone member defining a feed opening for permitting feed to pass from the feeder tube to the pan member for presentation and consumption, the feed opening increasing in size as the cone member is moved toward the raised position;
wherein each of the wing members includes a plurality of fingers formed at a distal end and the pan member includes an upstanding wall, the upstanding side wall including a lip for adjustably engaging the plurality of fingers to adjust the position of the feeder tube relative to the pan member.

22. The feeder assembly of claim 21 wherein the lip extends annularly and includes a double-flange arrangement for interlocking with the projecting fingers.

23. A feeder assembly for birds or other animals comprising:
(a) a pan member;
(b) a feeder tube defining a channel for receiving feed from a feed supply;
(c) a plurality of wing members joined to the feeder tube; and
(d) a cone member disposed about the feeder tube and slidably mounted to the plurality of wing members, the cone member adapted to slide relative to the wing members between a lowered position and a raised position, the pan member and an end of the cone member defining a feed opening for permitting feed to pass from the feeder tube to the pan member for presentation and consumption, the feed opening increasing in size as the cone member is moved toward the raised position;
wherein the wing members and the feeder tube are integral with each other.

24. A feeder assembly for birds or other animals comprising:
(a) a pan member having an upstanding peripheral wall;
(b) a feeder tube defining a channel for receiving feed from a feed supply;
(c) a plurality of wing members integral with the feeder tube adjustably engaging the peripheral wall, each wing member defining an aperture; and (d) a cone member disposed about the feeder tube and including a plurality of engaging arms slidably received by the apertures of the wing member to permit sliding of the cone member relative to the wing members and feeder tube between a lowered position and a raised position, the pan member and an end of the cone member defining a feed opening for permitting feed to pass from the feeder tube to the pan member for presentation and consumption, the size of the feed opening being adjustable by adjusting the positioning of the wing members relative to the peripheral wall of the pan member and by sliding the cone member relative to the wing members and the feeder tube.

25. The feeder assembly of claim 24 wherein each wing member includes at its distal end a plurality of engaging fingers adjustably engaging the peripheral wall.

26. The feeder assembly of claim 24 wherein each of the engaging arms includes a locking ledge adapted to engage a respective wing member when the cone member is in the raised position to prevent the cone member from disengaging from the wing members.

27. The feeder assembly of claim 24 wherein the feeder tube is integral with the wing members.

* * * * *